United States Patent
McIntyre

(10) Patent No.: US 6,530,438 B1
(45) Date of Patent: Mar. 11, 2003

(54) APPARATUS AND PROCESS FOR REMOVING DRILLING FLUID FROM DRILL CUTTINGS

(76) Inventor: Barry E. McIntyre, 260 Sienna Park Dr. SW, Calgary, Alberta (CA), T3H 3L6

( * ) Notice: Subject to any disclaimer, the term of this patent is extended or adjusted under 35 U.S.C. 154(b) by 0 days.

(21) Appl. No.: 09/506,085

(22) Filed: Feb. 17, 2000

(30) Foreign Application Priority Data

Feb. 17, 1999 (CA) .............................................. 2262192

(51) Int. Cl.[7] .......................... E21B 21/01; E21B 21/06
(52) U.S. Cl. .......................... 175/66; 175/206; 175/207; 210/170; 210/747; 210/774; 210/787
(58) Field of Search .............................. 166/75.12, 267; 210/170, 747, 767, 774, 787, 908; 175/66, 206, 207; 507/910; 588/228, 230

(56) References Cited

U.S. PATENT DOCUMENTS

| | | | |
|---|---|---|---|
| 4,387,514 A | * | 6/1983 | McCaskill, Jr. ......... 175/206 X |
| 4,411,074 A | * | 10/1983 | Daly ...................... 175/66 X |
| 4,575,336 A | * | 3/1986 | Mudd et al. ................. 432/72 |
| 4,683,963 A | * | 8/1987 | Skinner ....................... 175/66 |
| 4,836,302 A | * | 6/1989 | Heilhecker et al. ......... 175/66 |
| 4,881,473 A | * | 11/1989 | Skinner ..................... 110/244 |
| 5,090,498 A | * | 2/1992 | Hamill ....................... 175/206 |
| 5,454,957 A | * | 10/1995 | Roff ......................... 175/66 X |
| 5,570,749 A | * | 11/1996 | Reed ........................... 175/66 |
| 6,106,733 A | * | 8/2000 | Wood ......................... 210/774 |

* cited by examiner

Primary Examiner—George Suchfield
(74) Attorney, Agent, or Firm—Millen, White, Zelano & Branigan, P.C.

(57) ABSTRACT

Liquids are removed from drill cuttings generated during drilling operations, recovered and recycled to the rig drilling fluid system, reducing the amount of waste generated and fluid lost. The process and apparatus to achieve this uses a fluid bed thermal desorption unit that vaporizes the liquids from the cuttings. A portion of this vapour is recycled to fluidize the bed, enhance heat transfer and maintain a low oxygen environment in the desorption chamber. The cuttings become the bed medium. The drilling fluid system is used to condense the vapours for re-use. The unit allows for varying rates of cuttings generation and varying composition of those cuttings.

7 Claims, 2 Drawing Sheets

APPARATUS AND PROCESS FOR REMOVING DRILLING FLUID FROM DRILL CUTTINGS

FIELD OF THE INVENTION

The present invention relates to a system for recovering drilling fluid from drill cuttings being produced by a drilling rig and recycling the recovered fluid to the rig drilling fluid storage and circulating system. More particularly the invention incorporates bed desorption, preferably fluid bed desorption, wherein forced gas convection heating is used to vaporize the drilling fluid. The vaporized fluid is then condensed and returned to the rig storage and circulating system.

BACKGROUND OF THE INVENTION

Drilling for oil and gas produces drill cuttings. As drilling progresses, the cuttings are brought to surface by the circulation of drilling fluid through the wellbore. The cuttings are usually separated from most of the drilling fluid using vibrating screens, referred to as shale shakers, and centrifuges.

The cuttings retain a significant volume of drilling fluid on them after separation. It is desirable to clean the cuttings by removing the fluid and to return the latter to the rig's drilling fluid storage and circulating system (herein referred to as the "rig fluid system"), for re-use. Otherwise the cuttings remain associated with drilling fluid and create a disposal problem involving environmental considerations. The drilling fluid often is oil based and may incorporate chemicals.

Current methods for disposing of cuttings contaminated with drilling fluid include: hauling the cuttings to a land fill and burying them; composting; bio-remediation; thermal desorption; and combustion.

Currently used thermal desorption processes for cleaning the drill cuttings are implemented after the rig has completed drilling. The processes commonly involve an eternally heated rotating drum for volatilizing the liquid. The off gases are burned rather than being recovered.

Another thermal method used involves fending the cuttings into kilns or fluidized bed reactors, wherein the fluid is directly burned off. Again, this is practised after drilling is finished.

These prior art thermal systems involve large scale, fixed capacity units that rely on constant rate, uniform composition feed. They are not adapted to clean cuttings while drilling is ongoing nor do they return separated drilling fluid to the drilling fluid system. Otherwise stated, they are not amenable to being integrated into the on-going drilling operation.

It is therefore the objective of the present invention to provide a thermal process for recovering drilling fluid from cuttings while drilling is on-going, so that the recovered fluid can be recycled to the rig drilling fluid system.

SUMMARY OF THE INVENTION

The present invention is directed to method and apparatus for cleaning drill cuttings as they are produced by a rig involved in drilling a wellbore. Drilling fluid coating the cuttings is to be recovered and recycled to the rig's fluid system.

More particularly the coated drill cuttings are fed into a pressurized desorption chamber through which a stream of hot gas is pumped, to heat cuttings by convection and preferably fluidize them, thereby evaporating drilling fluid coating the cuttings. Optionally, indirect heat may be used to supplement the convective heat. Heating gas and drilling fluid vapours are removed from the chamber as an overhead stream. Part of the overhead stream is condensed to reclaim drilling fluid in liquid form. The reclaimed drilling fluid liquid is then recycled to the rig's fluid system. Cuttings are removed from the desorption chamber as an underflow, preferably al variable rates to control the solids volume in the chamber below a maximum allowable level.

A non-condensed portion of the overhead stream vapours is re-heated and recycled for use as the forced convection heating gas. The recycled gases, containing condensible vapours such as hydrocarbons and water, maintain a low oxygen atmosphere in the desorption chamber, which reduces the risk of explosion.

Preferably the temperature in the desorption chamber is maintained in the range of 400° F. to 600° F., more preferably 540° F. to 570° F. As a result the temperature in the chamber is sufficient for evaporation but below the temperature at which coking, cracking and oxidation reactions become a problem.

Broadly stated, in one aspect the invention is concerned with a method for cleaning drill cuttings being produced by a drilling rig having a drilling fluid storage and circulating system, the cuttings being coated with drilling fluid, comprising: feeding the cuttings into a pressurized desorption chamber having an overhead vapor outlet and an underflow cuttings outlet; pumping hot pressurized healing gas through the chamber to contact and directly heat cuttings, by convection, so that drilling fluid on the cuttings is vaporized; discharging a gaseous mixture of heating gas and drilling fluid vapours through the overhead outlet; condensing part of the gaseous mixture to recover drilling fluid vapours in liquid form, thereby leaving part of the gaseous mixture as non-condensed gas containing condensible vapours; recycling the recovered liquid to the rig drilling fluid storage and circulating system; heating non-condensed gas and recycling it to the desorption chamber as heating gas; and removing cleaned cuttings from the desorption chamber through the underflow cuttings outlet.

In another aspect, the invention is concerned with a circuit for cleaning drill cuttings produced by a drilling rig having a drilling fluid storage and circulating system, the cuttings being coated with drilling fluid, comprising: a vessel forming a pressure desorption chamber having an overhead vapour outlet and underflow cuttings outlet; means for feeding drill cuttings into the chamber as they are produced by the rig; means for pumping hot pressurized heating gas through the chamber to heat cuttings by convection so that drilling fluid on the cuttings is vaporized to produce a mixture of heating gas and drilling fluid vapour, means for condensing part of the mixture leaving the chamber through the overhead vapour outlet, to produce liquid drilling fluid, thereby leaving part of the gaseous mixture as non-condensed gas containing condensible vapours, means for recycling liquid drilling fluid to the drilling fluid storage and circulating system; means for heating and recycling non-condensed gas to the chamber as heating gas; and means for removing cleaned cuttings from the desorption chamber.

DESCRIPTION OF THE PREFERRED EMBODIMENT

Figure 1:
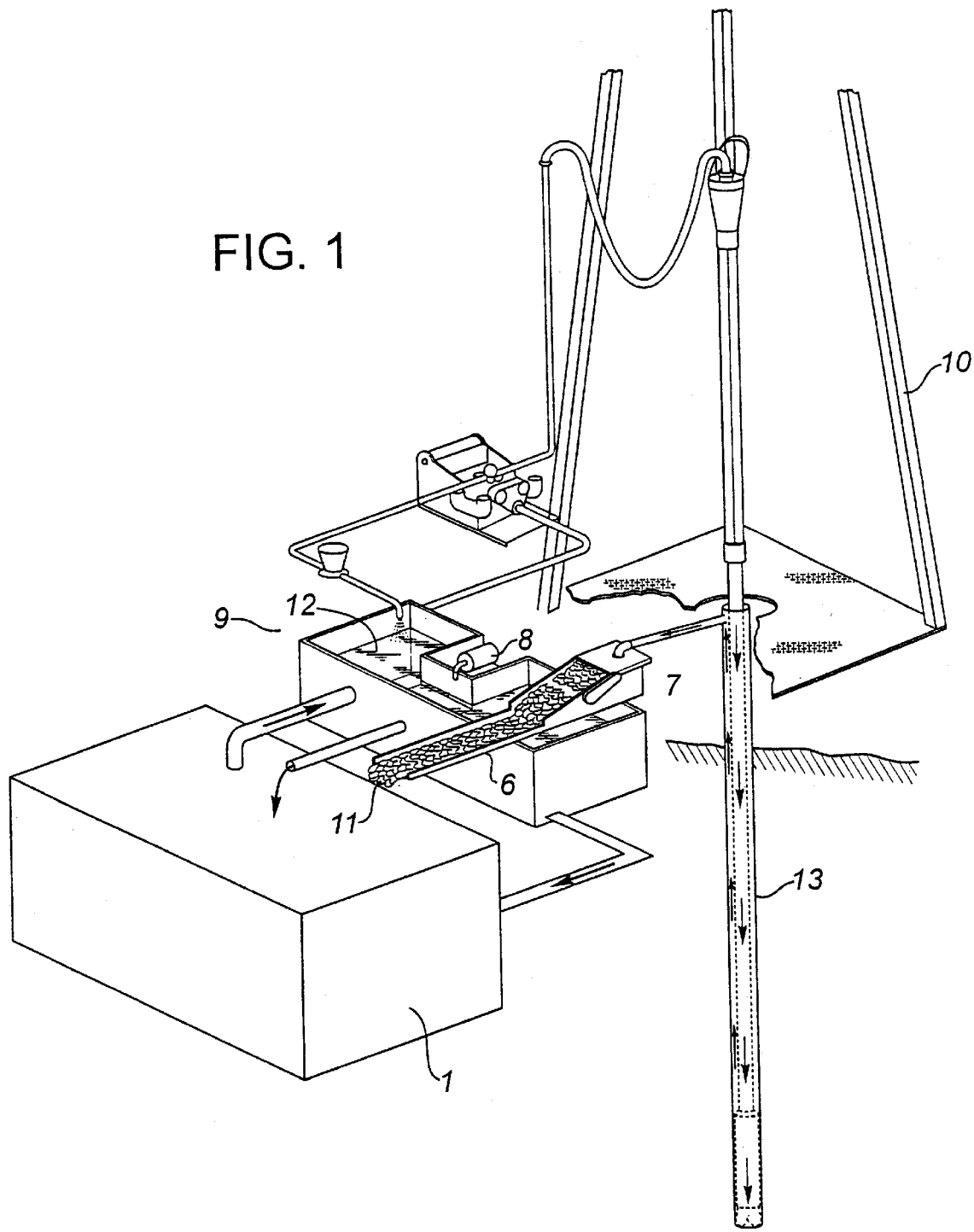
FIG. 1 is a schematic showing a system or circuit for cleaning drill cuttings, tied in with the shale shaker centrifuge and drilling fluid system of a rig drilling a wellbore.
Figure 2:
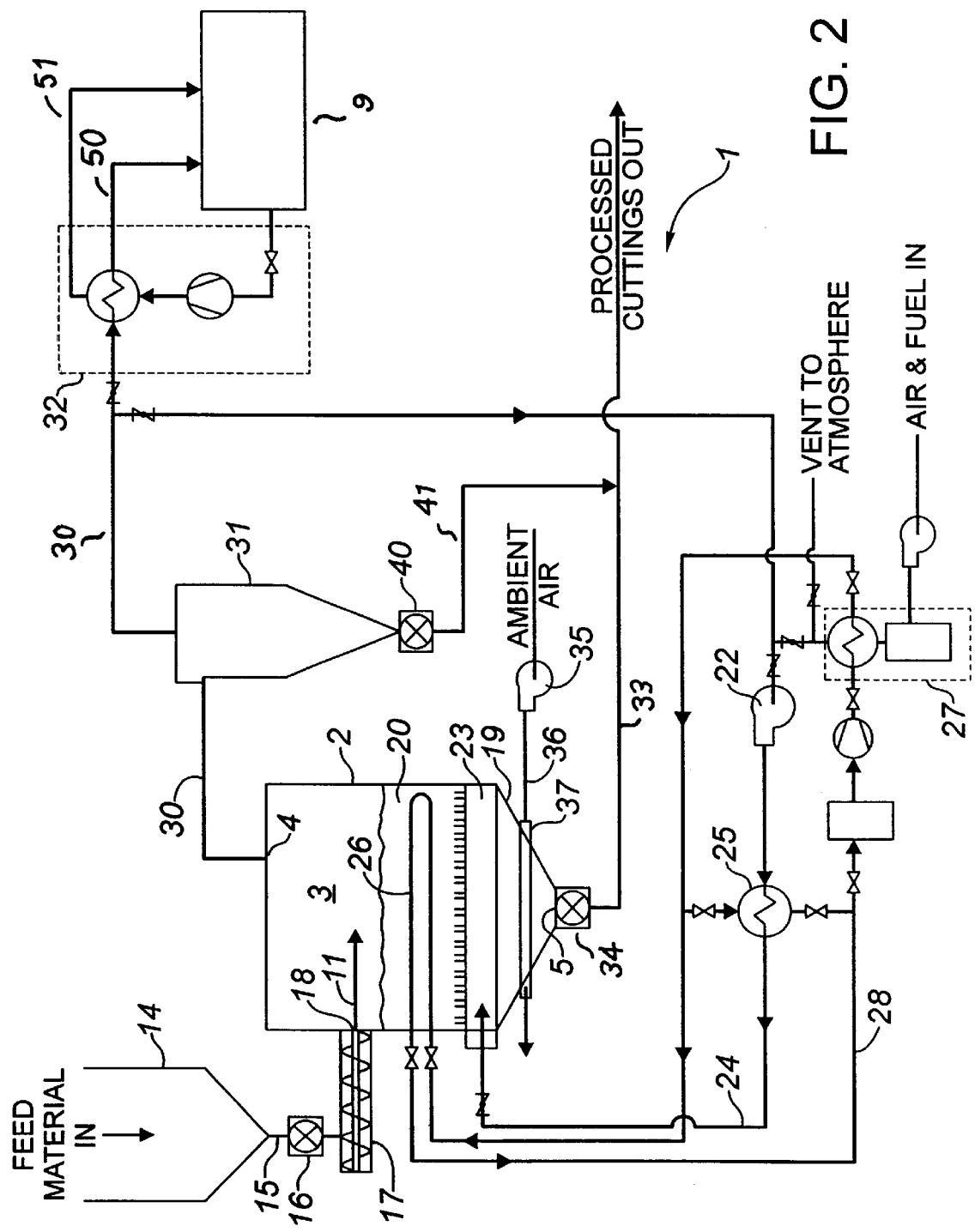
FIG. 2 is a process flow diagram showing the circuit of FIG. 1.

The circuit 1 comprises a closed pressure vessel 2 forming an internal desorption chamber 3. The chamber 3 has an overhead vapour outlet 4 and underflow cuttings outlet 5. The bottom 19 of the vessel 2 is conical with the outlet 5 at its apex.

A drill cuttings recovery means 6, such as a shale shaker 7 and centrifuge 8, is connected with and forms part of the drilling fluid system 9 of a rig 10. The means 6 separates drill cuttings 11 from drilling fluid 12 being circulated out of the wellbore 13. The cuttings 11 are collected in a buffer storage hopper 14.

The hopper 14 is connected by a bottom discharge line 15 and variable rate valve 16 with a screw conveyor 17. The conveyor 17 is connected through an inlet 18 with the desorption chamber 3.

From the foregoing, it will be understood that drill cuttings 11, coated with drilling fluid and being produced by the rig 10 in the course of drilling the wellbore 13, are collected in the hopper 14 and are fed by the screw conveyor 17 into the chamber 3. The rig will produce the cuttings at variable rates. The speed of the screw conveyor 17 can be varied to cope with variations in the production rate of the cuttings.

The cuttings 11 typically have a fluid content of around 20%, but this can vary widely, for example between 6 and 45%.

The cuttings 11 form the bed 20 in the chamber 3. Here they are heated by convection, using recycled hot vapours 21 pumped by a fan 22 into the bed 20 through a manifold 23, line 24, and pre-heater 25. The hot vapours 21 are typically at 500° F. In the embodiment shown, additional heat is supplied by a hot oil coil 26 receiving hot oil from an oil beating unit 27 through line 28. The hot oil is heated to between 450° F.–650° F., depending on the through put of cuttings. The temperature within the chamber 3 is maintained within the range 400° F. to 600° F., preferably at 540° F. to 570° F. Preferably the recycled hot vapours are supplied at a rate sufficient to maintain partial or complete fluidization. However it has been found that low rates can satisfactorily be used with virtually no fluidization.

The resulting heat input vaporizes the drilling fluid liquid attached to the cuttings 11, separating the liquid from the cuttings.

A mixture of heating gas and drilling fluid vapours leaves the chamber 3 through vapour outlet 4 and line 30. The gas mixture is preferably processed in a cyclone 31 to remove fine particles.

A portion of the gas mixture, containing condensible vapours such as water and hydrocarbons, is preferably drawn off for recycle to chamber 3. It is passed through line 24 and heated by heat exchange with the hot oil in line 28. The flow rate of the recycled vapour is preferably kept constant to maintain the chamber temperature and fluidizing characteristics constant, regardless of cuttings flow rates. For example, if no cuttings are being fed into the chamber 3, or if the cuttings are deficient in liquids, the same gas will recycle until there are sufficient vapours to require flow to the condensing step. This keeps a constant recycling flow during variable operating conditions.

The remaining vapours are then condensed, preferably using the drilling fluid system 9. The vapour flow is typically less than 0.1% of the fluid flow in the system 9. Condensation is carried out by circulating a fluid flow from the fluid system 9 through heat exchanger 32 which is connected with gas mixture lien 30. The drilling fluid us for cooling and the condensed vapours are returned to the drilling fluid system 9 through lines 50, 51 respectively.

The cuttings 11, after vaporization of liquids, are expelled from the bottom of the chamber 3 through line 33 and valve 34. The latter may be a slide or rotary valve.

The rate of expulsion is adjusted to match the rate of introduction of cuttings. This provides a means of varying the through put rate depending on the cuttings generation rate. The exiting cuttings are partially cooled by ambient air pumped by pump 36 through line 36 and heat exchange tubes 37. The tubes 37 isolate the air flow from the interior of the chamber 3. The cooling air exits the vessel 2 to atmosphere or may be recovered for its heat value for use in heating the cuttings as they enter chamber 3.

Due to the nature of the drilling operation, the adjustments will be to lower the flow from maximum throughput rate. As drilling progresses to greater depths, the hole size is normally reduced at intervals. This reduces the rate at which cuttings are generated. Exceeding the maximum rate will diminish the effectiveness of the fluid removal. The buffer hopper 14 handles surges above the maximum rate, and is to be sized based on expected maximum cuttings generation rates versus system processing capacity. The recycle gas is at a constant rate, with the hot oil temperature control used to prevent overheating.

The fines are expelled from the bottom of the cyclone 31 via valve 40 and line 41. The valve 40 is similar to that at the bottom of the fluid bed 20. All solids are conveyed to a storage pile if on land or overboard if off-shore. It may be necessary to reduce the temperature of the solids. This can be achieved by using methods such as a water quench in the output conveyor. This is external to the process of removing the liquids.

The preferred form of the apparatus and corresponding process provide an integrated system for removing and recovering drilling fluid liquids from drill cuttings. The characteristics of the fluid bed system include the use of the drill cuttings as the bed material, hot oil for heating the bed and recycled vapour and/or oil heater exhaust gas for hearing and fluidizing the bed, with a constant recycle rate used to maintain bed characteristics regardless of feed drill cuttings flow and content. Further characteristics of the preferred process are the use of cyclones when necessary for particulate removal instead of more complicated fines removal methods, use of the drilling fluid system for cooling rather than more expensive, complicated alternatives, and the use of variable rate valves to adjust the material flow to the rate generated by the drilling operation. The invention enables in-line recovery of drilling fluids and minimizes the amount of waste generated in the form of contaminated drill cuttings and solids.

The invention can be sized for any throughput requirement through scaling of the components. The system can also be adapted for use on both land and off-shore with minor changes. In both cases the basic components of both the apparatus and process are retained.

An example of the embodiment described follows. This is a land based application requiring 2 metric tonnes per hour through put cepacity.

The process and equipment parameters selected for this example are detailed below. For this application a residence time of 1 hour was selected as the basis for the maximum sustained material input of 4410 lb/hr. The system can be turned down from this capacity to suit the cuttings generation rate. A fluid content of 15% by weight was used in this example. t,110
The cyclone design specifications are shown below. These rely on standard methods based on expected material composition and proportion in the flow.

| Cyclone Fractional Efficiency (Koch & Licht Eqns) | |
|---|---|
| Input Data | |
| Body Diameter (Dc) | 2 ft |
| Inlet Height (a) | 1 ft |
| Inlet Width (b) | 0.4 ft |
| Outlet Width (S) | 1.3 ft |
| Outlet Diameter (De) | 1 ft |
| Cylinder Height (h) | 3 ft |
| Overall Height (H) | 6 ft |
| Dust Outlet Diameter (B) | 1 ft |
| Gas Pressure | 3 in wc |
| Dust Abs Density (Rho) | 100 lb/cu ft |
| Air Temp | 500° F. |
| Gas Flowrate | 3859.0847 lb/hr |
| Grain Loading | 208.50 gr/ACF |
| Ash Rate | 2760.3 lb/hr |
| Intermediate Results | |
| Natural Length: | 4.954619 |
| Cyclone Volume: | 7.147123 |
| Config Factor: | 545.8517 |
| Velocity Heads: | 6.4 |
| Air Flow (ACFS): | 25.7425 |
| Air Density | 0.041642 |
| Air Viscosity: | 1.9E-05 |
| Vortex Exponent: | 0.550829 |
| Saltation Velocity (ft/s): | 70.30178 |
| Pressure Drop (in wc): | 3.311417 |
| Internal Plumbing | |
| d: | 0.91506 |
| Vol (natural) | 7.130605 |
| Vol (below exit): | 7.147123 |
| Vol (annular): | 1.884956 |
| K (c): | 0.682315 |
| K (a): | 0.5 |
| K (b): | 0.2 |
| Inlet Velocity (ft/s): | 64.35626 |
| w (ft/s): | 3.593214 |
| General Dimensions | |
| Top Surface | 2.4 sq ft |
| Cylinder Surface | 18.8 sq ft |
| Cone Surface | 22.7 sq ft |
| Total | 73.9 sq ft |
| Outlet shroud Surface | 4.1 sq ft |

The equipment in the designed process configuration is to be mounted on a trailer to be transported to site by tractor unit. The major components of the processing unit are shown.

When moved to location the surge hopper is set up with the outlet flowing into the desorption vessel. A conveyor of either belt or screw type transports the shale shaker overflow and centrifuge underflow to the unit. The lengths of these are dependent on the site layout. These are to be sized to suit the specific need. Similar conveyors are attached to the outlets to move the cuttings into a pile. If conditions require, a water quench or other cooling method may be utilized to cool the cuttings.

A fuel source supplies diesel fuel for the heater unit, and power is supplied from either the rig generation system or by a stand alone generator.

The best mode of the invention has been explained in detail. However it is to be understood that the invention is not limited in its application to the details to the construction and the arrangement of components set forth. The invention is capable of other embodiments and of being praised in various ways. The scope of the invention is defined in the claims now following.

The entire disclosure of all applications, patents and publications, cited above, and of corresponding application Canadian application No. 2,262,192, filed Feb. 17, 1999, is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

The embodiments of the invention in which an exclusive property or privilege is claimed are defined as follows:

1. A method for cleaning drill cuttings being produced by a drilling rig having a drilling fluid storage and circulating system, the cuttings being coated with drilling fluid, comprising:

feeding the cuttings into a pressurized desorption chamber having an overhead vapour outlet and an underflow cuttings outlet;

pumping hot pressurized heating gas through the chamber to contact and directly heat cuttings, by convection, so that drilling fluid on the cuttings is vaporized;

discharging a gaseous mixture of heating gas and drilling fluid vapours through the overhead outlet;

condensing part of the gaseous mixture to recover drilling fluid vapours in liquid form, thereby leaving pan of the gaseous mixture as non-condensed gas containing condensible vapours;

recycling the recovered liquid to the rig drilling fluid storage and circulating system;

heating at least part of the non-condensed gas and recycling it to the desorption chamber as heating gas; and removing cleaned cuttings from the desorption chamber through the underflow cuttings outlet.

2. The method as set forth in claim 1 wherein the cuttings are introduced into the desorption chamber at variable rates and cleaned cuttings are removed through the underflow cuttings outlet at controlled rates to maintain a substantially constant volume of cuttings in the chamber.

3. The method as set forth in claim 1 wherein the temperature in the desorption chamber is maintained in the range 540° F. to 570° F. and the cuttings in the chamber are at least partly fluidized by the heating gas.

4. The method as set forth in claim 2 wherein the temperature in the desorption chamber is maintained in the range 540° F. to 570° F. and the cuttings in the chamber are at least partly fluidized by the heating gas.

5. The method as set forth in claims 1, 2, 3 or 4 wherein the non-condensed gas is recycled at a substantially constant rate.

6. The method as set forth in claims 1, 2, 3 or 4 wherein the drilling fluid is oil based.

7. The circuit for cleaning drill cuttings produced by a drilling rig having a drilling fluid storage and circulating system, the cuttings being coated with drilling fluid, comprising:

a vessel forming a pressure desorption chamber having an overhead vapour outlet and underflow cuttings outlet;

means for feeding drill cuttings into the chamber as they are produced by the rig;

means for pumping hot pressurized heating gas through the chamber to heat cuttings by convection so that drilling fluid on the cuttings is vaporized to produce a mixture of hearing gas and drilling fluid vapour;

means for condensing part of the mixture leaving the clamber through the overhead vapour outlet, to produce liquid drilling fluid, thereby leaving part of the gaseous mixture as non-condensed gas containing condensible vapours;

means for recycling liquid drilling fluid to the drilling fluid storage and circulating system;

means for heating and recycling at least part of the non-condensed gas to the chamber as heating gas; and means for removing cleaned cuttings from the desorption chamber.

* * * * *